United States Patent
Dong et al.

(10) Patent No.: US 11,864,252 B2
(45) Date of Patent: Jan. 2, 2024

(54) SYSTEMS AND METHODS FOR STATE CONTEXT MANAGEMENT IN DUAL CONNECTIVITY NETWORK ENVIRONMENTS

(71) Applicant: Verizon Patent and Licensing Inc., Basking Ridge, NJ (US)

(72) Inventors: Yuexin Dong, Bridgewater, NJ (US); Sudhakar Reddy Patil, Flower Mound, TX (US); Jin Yang, Orinda, CA (US); Vishwanath Ramamurthi, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 18/068,046

(22) Filed: Dec. 19, 2022

(65) Prior Publication Data
US 2023/0120422 A1    Apr. 20, 2023

Related U.S. Application Data

(63) Continuation of application No. 17/101,502, filed on Nov. 23, 2020, now Pat. No. 11,553,544.

(51) Int. Cl.
*H04W 76/15* (2018.01)
*H04W 76/32* (2018.01)
*H04W 76/38* (2018.01)
*H04W 76/27* (2018.01)

(52) U.S. Cl.
CPC ......... *H04W 76/15* (2018.02); *H04W 76/27* (2018.02); *H04W 76/32* (2018.02); *H04W 76/38* (2018.02)

(58) Field of Classification Search
CPC ..... H04W 76/38; H04W 76/15; H04W 76/27; H04W 76/32
See application file for complete search history.

(56) References Cited

U.S. PATENT DOCUMENTS

| 2019/0124711 | A1 | 4/2019 | Dai | |
|---|---|---|---|---|
| 2020/0029262 | A1* | 1/2020 | Kim | H04W 74/0833 |
| 2021/0274587 | A1* | 9/2021 | Jung | H04W 12/0433 |
| 2023/0070154 | A1* | 3/2023 | Torabian Esfahani | H04W 60/005 |
| 2023/0099609 | A1* | 3/2023 | Xu | H04W 36/0033 370/331 |

OTHER PUBLICATIONS

"Remaining issues on state transition between RRC Connected and Inactive", R2-1808100 Huawei, 3GPP WG2 #102 Busan May 21-25, 2018 (Year: 2018).

* cited by examiner

*Primary Examiner* — Basil Ma

(57) ABSTRACT

Devices, methods, and computer-readable media described herein and provide for sending, by a first wireless station, a suspend message to a wireless station associated with a radio resource control (RRC) session for a dual connectivity (DC) capable user equipment (UE) device that places the DC capable UE device in an RRC inactive mode; storing, by the first wireless station, UE context information from a core network for the DC capable UE device for the RRC session; and evaluating, by the first wireless station, a set of criteria to determine whether to also store the UE context information at the wireless station.

20 Claims, 6 Drawing Sheets

SYSTEMS AND METHODS FOR STATE CONTEXT MANAGEMENT IN DUAL CONNECTIVITY NETWORK ENVIRONMENTS

RELATED APPLICATION

This patent application is a Continuation of U.S. application Ser. No. 17/101,502 filed on Nov. 23, 2020, titled "SYSTEMS AND METHODS FOR STATE CONTEXT MANAGEMENT IN DUAL CONNECTIVITY NETWORK ENVIRONMENTS," the disclosure of which is hereby incorporated by reference herein in its entirety.

BACKGROUND INFORMATION

Fifth Generation (5G) New Radio (NR) technology provides various enhancements to wireless communications, such as flexible bandwidth allocation, improved spectral efficiency, ultra-reliable low-latency communications (URLLC), beamforming, high-frequency communication (e.g., millimeter wave (mmWave)), as well as others. 5G systems support multi-radio dual connectivity (MR-DC) operations. For example, NR-NR dual-connectivity (NR-DC) involves simultaneous connections to both a master 5G NR wireless station and at least one secondary 5G NR wireless station. In these non-standalone (NSA) 5G NR networks, the defined states for the NR-DC UE include a Radio Resource Control (RRC) Inactive state, in which the master node stores access stratum (AS) context of the UE, and controls whether the same AS context is also to be stored at the secondary node.

DETAILED DESCRIPTION OF EXAMPLE EMBODIMENTS

The following detailed description refers to the accompanying drawings. The same reference numbers in different drawings may identify the same or similar elements. Also, the following detailed description does not limit the invention.

Implementations described herein relate to context state management for an MR-DC (e.g., NR-DC, etc.) device operating in defined modes and transitioning therebetween in accordance with 5G NR protocols/standards. For example, in one implementation, an NR-DC device may, upon power-up, transition from an NR RRC idle mode or a disconnected (unregistered) state to an NR RRC connected mode with multiple 5G wireless stations at once. The NR-DC device is allowed to connect to an "anchor" cell (also referred to herein as master cell group (MCG)) associated with, for example, one 5G radio access network (RAN), and at least one secondary cell (also referred to herein as secondary cell group (SCG)) associated with another 5G RAN, to access 5G services from a service provider during an RRC session. The term "anchor cell," as used herein, refers to a cell or channel associated with a master wireless station (or master node).

In the NR RRC connected mode, NR-DC device context information is stored in both the master node and the secondary node. In an NR RRC inactive mode, the master node stores the NR-DC context information, and controls whether the NR-DC information is also stored in the secondary node. In implementations described herein, the master node evaluates identified criteria to determine whether to instruct the secondary node to store the NR-DC context information.

Figure 1:
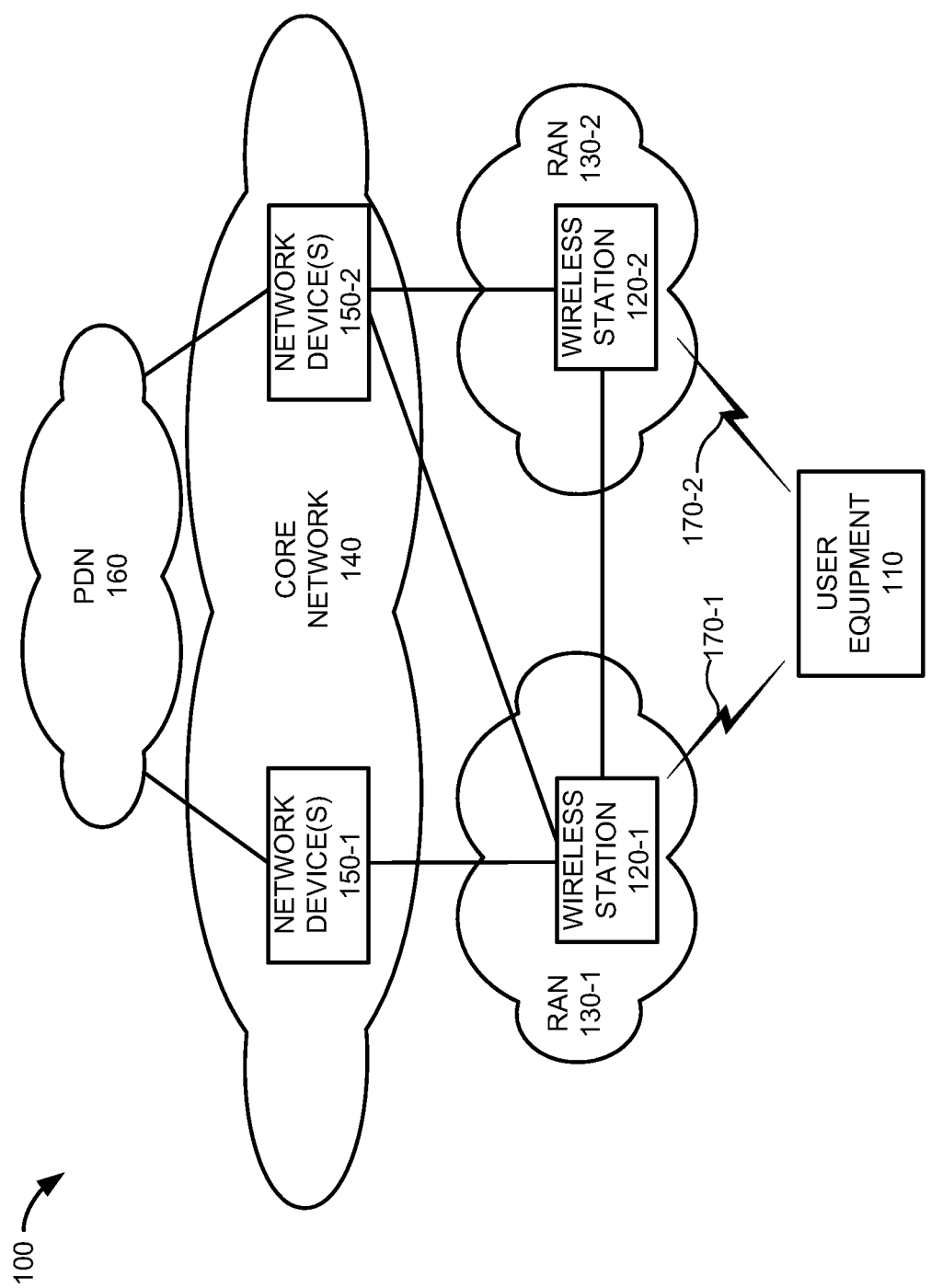
FIG. 1 illustrates an exemplary environment in which systems and methods described herein may be implemented.

FIG. 1 is a diagram of an exemplary environment 100 in which the systems and methods described herein may be implemented. Referring to FIG. 1, environment 100 includes user equipment (UE) 110, a wireless station 120-1 associated with a radio access network (RAN) 130-1, a wireless station 120-2 associated with a RAN 130-2, a core network 140 with network devices 150-1 and 150-2, and a packet data network (PDN) 160. Wireless stations 120-1 and 120-2 may be referred to herein collectively as wireless stations 120 and individually as wireless station 120 or 120-X, RANs 130-1 and 130-2 may be referred to herein collectively as RANs 130 and individually as RAN 130 or 130-X. Network devices 150-1 and 150-2 may be referred to herein collectively as network devices 150 and individually as network device 150 or 150-X. In other embodiments, environment 100 may include additional networks, fewer networks, and/or different types of networks than those illustrated and described herein.

Environment 100 includes links between the networks and between the devices. For example, environment 100 may include wired, optical, and/or wireless links among the devices and the networks illustrated. A communicative connection via a link may be direct and/or indirect. For example, an indirect communicative connection may involve an intermediary device and/or an intermediary network not illustrated in FIG. 1. Additionally, the number and the arrangement of links illustrated in environment 100 are exemplary. In the configuration illustrated in FIG. 1, UE 110 may use wireless channels 170-1 and 170-2 (referred to collectively as wireless channels 170) to access wireless stations 120-1 and 120-2, respectively. Wireless channels 170 may correspond, for example, to a physical layer in accordance with 5G NR standards (e.g., 3GPP-defined 5G air interfaces).

UE 110 (also referred to herein as UE device 110 or user device 110), may include any type of UE device having MR-DC mode capabilities (e.g., NR-DC capabilities) and is able to communicate with different wireless stations (e.g., wireless stations 120) using different wireless channels (e.g., channels 170) corresponding to different RANs (e.g., RANs 130-1 and 130-2). UE 110 may be a mobile device that may include, for example, a cellular radiotelephone, a smart phone, a tablet, any type of internet protocol (IP) communications device, a Voice over Internet Protocol (VoIP) device, a personal computer (PC), a laptop computer, a notebook, a netbook, a wearable computer (e.g., a wrist watch, headgear, eye glasses, etc.), a gaming device, a navigation device, a media playing device, a digital camera that includes communication capabilities (e.g., wireless communication mechanisms such as Wi-Fi), etc. In other implementations, UE 110 may be implemented as a machine-type communications (MTC) device, an Internet of Things (IoT) device, a machine-to-machine (M2M) device, etc.

UE 110 may connect to RANs 130 and other devices in environment 100 via any conventional technique, such as wired, wireless, optical connections or a combination of these techniques. UE 110 and the user associated with UE 110 (e.g., the party holding or using UE 110) may be referred to collectively as UE 110 in the description below.

According to implementations described herein, UE 110 may be provisioned (e.g., via a subscriber identity module (SIM) card or another secure element) to recognize particular network identifiers (e.g., associated with RANs 130) and to support particular radio frequency (RF) spectrum ranges (e.g., sub-6, mmWave, licensed, unlicensed, etc.).

Wireless stations 120 may each include a network device that has computational and wireless communication capabilities. Wireless stations 120 may each include a transceiver system that connects UE device 110 to other components of RAN 130 and core network 140 using wireless/wired interfaces. Wireless stations 120 may be implemented as a base station (BS), a base transceiver station (BTS), a Node B, a next generation Node B (gNode B), an evolved Node B (eNode B), an evolved LTE (eLTE) eNB, a remote radio head (RRH), an RRH and a baseband unit (BBU), a BBU, a centralized unit, a distributed unit (DU), or other type of wireless node, such as a small cell (e.g., a picocell node, a femtocell node, a microcell node, etc.) that provides wireless access to RAN 130. Wireless stations 120 may support RANs 130 that operate in the same or different frequency bands. For example, in one implementation, both RAN 130-1 and RAN 130-2 may include 5G NR RANs for 5G networks.

Core network 140 may include one or multiple networks of one or multiple types. For example, core network 140 may be implemented to include a terrestrial network and/or a satellite network. According to an exemplary implementation, core network 140 includes a backhaul network pertaining to multiple RANs 130. For example, core network 140 may include a 5G network, a legacy network, etc.

Depending on the implementation, core network 140 may include various network elements that may be implemented in network devices 150. Such network elements may include a core access and mobility management function (AMF), a user plane function (UPF), a session management function (SMF), a unified data management (UDM), a policy control function (PCF), a user data repository (UDR), an authentication server function (AUSF) as well other network elements pertaining to various network-related functions, such as billing, security, authentication and authorization, network polices, subscriber profiles, network slicing, and/or other network elements that facilitate the operation of core network 140. In some implementations, wireless station 120-1 and wireless station 120-2 may directly interface with some network devices 150-2 (e.g., UPF) for data plane communications and wireless station 120-1 may directly interface with some network devices 150-1 (e.g., AMF) for control plane communications.

PDN 160 may include one or more networks, such as a local area network (LAN), a wide area network (WAN), a metropolitan area network (MAN), a telephone network, an application layer network, the Internet, etc., capable of communicating with UE 110. In one implementation, PDN 160 includes a network that provides data services (e.g., via packets or any other Internet protocol (IP) datagrams) to UE 110.

The number and arrangement of devices in environment 100 are exemplary. According to other embodiments, environment 100 may include additional devices (e.g., thousands of UEs 110, hundreds of wireless stations 120, dozens of RANs 130, etc.) and/or differently arranged devices, than those illustrated in FIG. 1.

As described above, in an exemplary implementation, UE 110 may be an NR-DC device capable of communicating via a 5G NR network. In provisioned systems based on current standards, UE 110 may connect to a cell based on the signal strengths of the particular base stations. However, criteria other than signal strength may be used for selecting among available cells.

Figure 2:
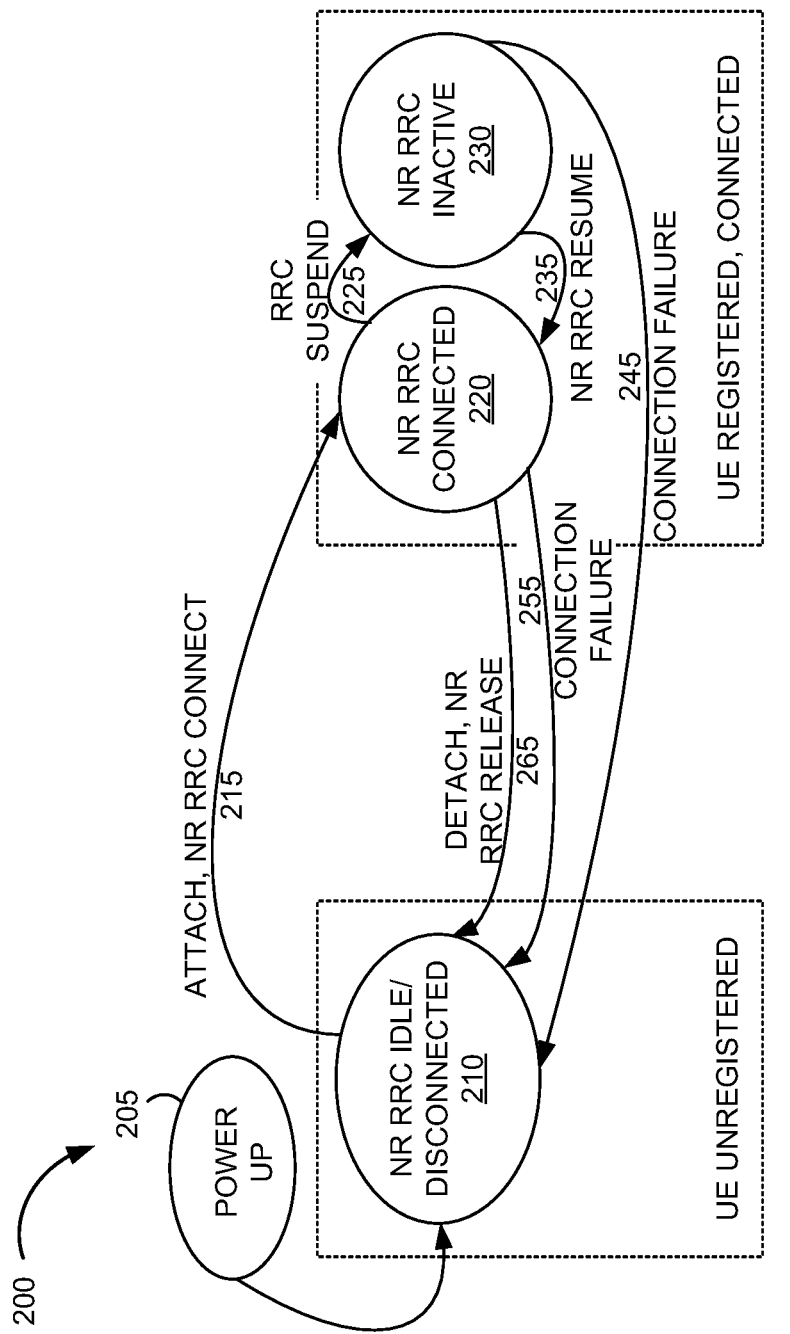
FIG. 2 illustrates exemplary operating modes and allowed state transitions for a 5G NR device of the environment of FIG. 1.

Referring to FIG. 2, existing 5G standards define RRC modes/states transitions 200 for UE 110 with respect to RAN 130. At power up 205, UE 110 may be unregistered with RAN 130, and may assume an RRC idle mode or disconnected state 210. UE 110 may, upon attachment and registration 215 via an RRC connection, transition to an RRC connected (active) mode 220. 5G standards define a third state, an RRC (connected) inactive mode 230, to reduce the control plane latency, reduce signaling overhead, reduce power consumption, etc., while at the same time reduce an amount of time to resume NR RRC connected mode 220. For example, periods of inactivity in RRC connected mode 220 result in the RRC session being suspended 225 and UE 110 being transitioned to RRC inactive mode 230, in which UE 110 is still registered and connected to RAN 130, unlike RRC idle mode 210 where UE 110 is disconnected and deregistered from RAN 130. UE 110 may subsequently transition from RRC inactive mode 230 back to RRC connected mode 220 using an RRC resume 235 operation. If UE 110 experiences a connection failure 245 while in RRC inactive mode 230, UE 110 may transition to disconnected state 210. If UE 110 experiences a connection failure 255 while in RRC connected mode 220, UE 110 may transition to disconnected state 210. From RRC connected mode 220, UE 110 may detach via an RRC release message 265 and transition to RRC idle mode or disconnected state 210, for example, to conserve bandwidth and/or signal radio bearers (SRBs) and/or to end the RRC session. RRC modes and/or state transitions other than what are depicted in FIG. 2 are possible.

Systems and methods described herein pertain to controlling the storage of UE context information for UE 110 in NR RRC inactive mode 230. In one implementation, a master node (e.g., wireless station 120-1) may determine the circumstances in which a secondary node (e.g., wireless station 120-2) is to store/not store context information for UE 110 when UE 110 is in NR RRC inactive mode 230. In this manner, when the advantages (e.g., improved RRC data session set-up time after transition to NR RRC connected mode 220, etc.) of storing UE context information in the secondary node outweigh the disadvantages (e.g., reduction of limited memory space, etc.) the secondary node may store the UE context information. In some implementations, the master node may evaluate, as further described below, predetermined criteria to determine a likelihood that the secondary node RRC connection will be maintained after UE 110 resumes NR RRC connected mode 220.

Figure 3:
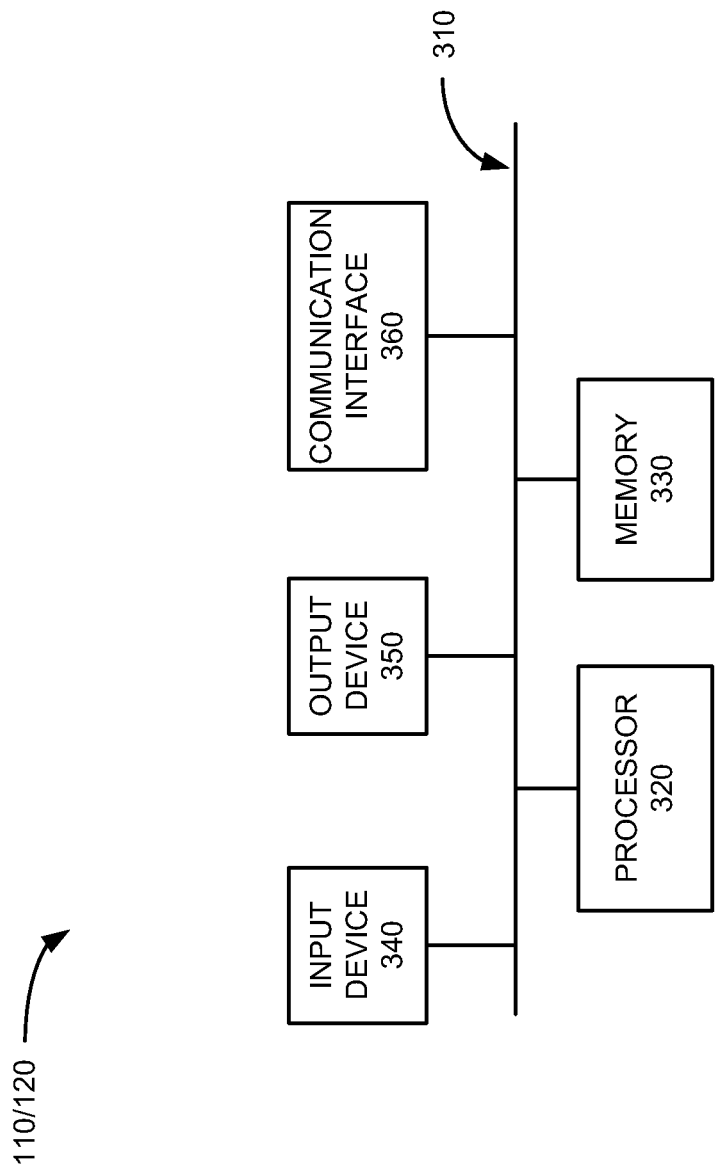
FIG. 3 illustrates an exemplary configuration of logic components included in one or more of the devices of FIG. 1.

FIG. 3 illustrates an exemplary configuration of UE 110. Other devices in environment 100, such as wireless stations 120, network devices 150 and elements in PDN 160 may be configured in a similar manner. Referring to FIG. 3, UE 110 may include bus 310, processor 320, a memory 330, an input device 340, an output device 350 and a communication interface 360. Bus 310 may include a path that permits communication among the elements of UE 110.

Processor 320 may include one or more processors, microprocessors, or processing logic that may interpret and execute instructions. Memory 330 may include a random access memory (RAM) or another type of dynamic storage device that may store information and instructions for execution by processor 320. Memory 330 may also include a read only memory (ROM) device or another type of static storage device that may store static information and instructions for use by processor 320. Memory 330 may further include a solid state drive (SDD). Memory 330 may also include a magnetic and/or optical recording medium (e.g., a hard disk) and its corresponding drive.

Input device 340 may include a mechanism that permits a user to input information to UE 110, such as a keyboard, a keypad, a mouse, a pen, a microphone, a touch screen, voice recognition and/or biometric mechanisms, etc. Output device 350 may include a mechanism that outputs information to the user, including a display (e.g., a liquid crystal display (LCD)), a printer, a speaker, etc. In some implementations, a touch screen display may act as both an input device and an output device.

Communication interface 360 may include one or more transceivers that UE 110 (or wireless station 120) uses to communicate with other devices via wired, wireless or optical mechanisms. For example, communication interface 360 may include one or more radio frequency (RF) transmitters, receivers and/or transceivers and one or more antennas for transmitting and receiving RF data via links 170. Communication interface 360 may also include a modem or an Ethernet interface to a LAN or other mechanisms for communicating with elements in a network, such as RAN 130 or another network.

The exemplary configuration illustrated in FIG. 3 is provided for simplicity. It should be understood that UE 110 (or wireless station 120) may include more or fewer devices than illustrated in FIG. 3. In an exemplary implementation, UE 110 (or wireless station 120) may perform operations in response to processor 320 executing sequences of instructions contained in a computer-readable medium, such as memory 330. A computer-readable medium may be defined as a physical or logical memory device. The software instructions may be read into memory 330 from another computer-readable medium (e.g., a hard disk drive (HDD), solid-state drive (SSD), etc.), or from another device via communication interface 360. Alternatively, hard-wired circuitry may be used in place of or in combination with software instructions to implement processes consistent with the implementations described herein. Thus, implementations described herein are not limited to any specific combination of hardware circuitry and software.

Figure 4:
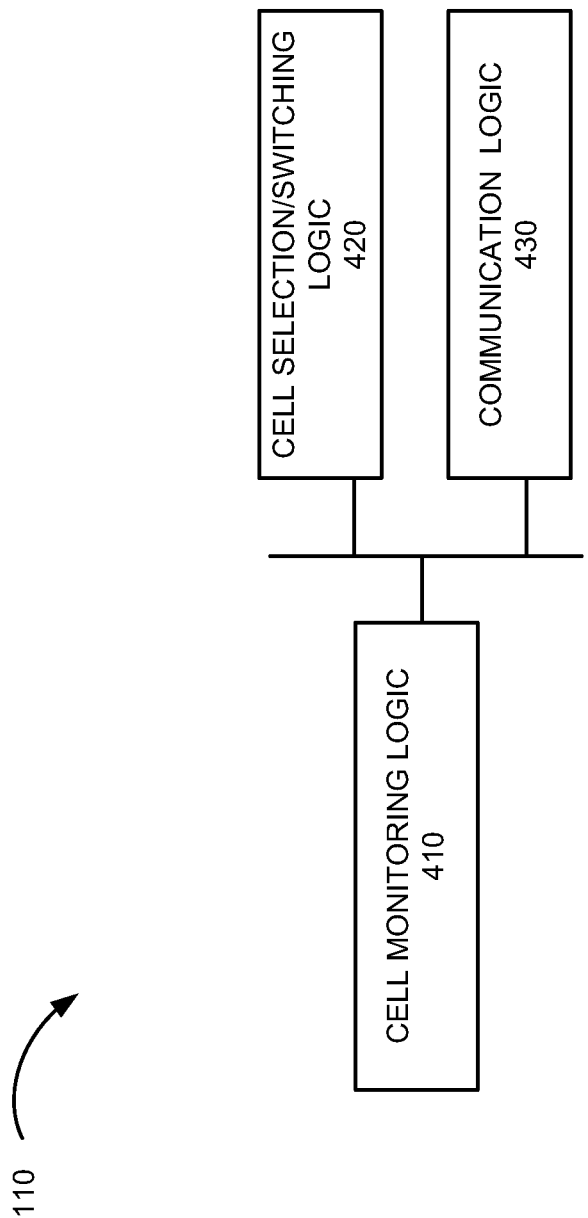
FIG. 4 illustrates an exemplary configuration of logic components implemented in the UE device of FIG. 1.

FIG. 4 is an exemplary functional block diagram of components implemented in UE 110. In an exemplary implementation, all or some of the components illustrated in FIG. 4 may be implemented by processor 320 executing software instructions stored in memory 330. In other implementations, all or some of the components illustrated in FIG. 4 may be implemented in hardware or a combination of hardware, firmware and software used to perform the functionality described below.

UE 110 may include cell monitoring logic 410, cell selection/switching logic 420 and communication logic 430. In alternative implementations, the components or a portion thereof may be located externally with respect to UE 110.

Cell monitoring logic 410 may include logic to measure and/or monitor the signal strengths of detected signals from associated cells. For example, UE 110 may measure the strength of communication signals from each of wireless stations 120.

Cell selection/switching logic 420 may include logic to select, based on information such as detected signal strengths from cell monitoring logic 410, a cell, such as an anchor cell (e.g., MCG) or a non-anchor cell (e.g., SCG) in environment 100. For example, UE 110 illustrated in FIG. 1 may establish communications with wireless station 120 associated with a cell (e.g., an anchor cell in this example) to access 5G NR services. For example, selecting a cell that corresponds to an anchor cell or MCG may allow that anchor cell or MCG to setup dual connectivity (DC) to gNBs (or SCGs) or other device (e.g., small cell) associated with communications via a 5G NR cell when UE 110 is located within a coverage area of the 5G NR cell, as further described below. In one implementation, cell selection/switching logic 420 may include logic for on-demand switching of connectivity from a current 5G SCG to another 5G SCG anchored by a same 5G MCG (or a different 5G MCG) using layer 2 signaling, for example, a media access control (MAC) control element (CE) associated with UE 110. In this manner, 5G (e.g., mmWave, sub-6, etc.) connectivity may be maintained, following UE 110's movement between 5G SCGs or UE 110's experiencing signal degradation (e.g., obstruction) within a current 5G SCG at the air interface, without disruption, as further described below.

Communication logic 430 may include logic to communicate with elements in environment 100, directly or indirectly. For example, communication logic 430 may, based on instructions from cell selection/switching logic 420, transmit and receive communications associated with establishing an RRC connection with appropriate wireless stations 120 in environment 100, such as wireless station 120-1 associated with an MCG. Communication logic 430 may, based on instructions from cell selection/switching logic 420, also transmit and receive communications associated with on-demand switching to establish a connection with wireless station 120-2 associated with an SCG.

Although FIG. 4 shows exemplary components of UE 110, in other implementations, UE 110 may include fewer components, different components, differently arranged components, or additional components than depicted in FIG. 4. In addition, functions described as being performed by one of the components in FIG. 4 may alternatively be performed by another one or more of the components of UE 110. Further, any of wireless stations 120 may correspond to an MCG or an SCG.

Figure 5:
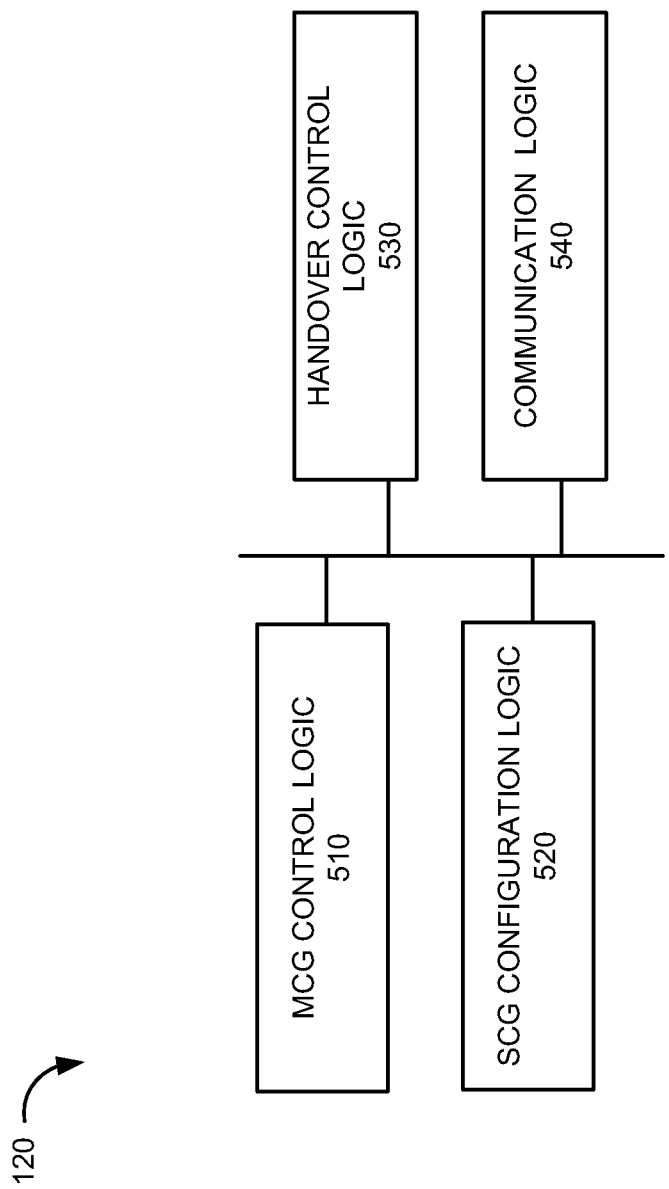
FIG. 5 illustrates an exemplary configuration of logic components implemented in a wireless station of FIG. 1.

FIG. 5 is an exemplary functional block diagram of components implemented in wireless station 120. In an exemplary implementation, all or some of the components illustrated in FIG. 5 may be implemented by processor 320 executing software instructions stored in memory 330. In other implementations, all or some of the components illustrated in FIG. 5 may be implemented in hardware or a combination of hardware, firmware and/or software used to perform the functionality described below.

Wireless station 120 may include MCG control logic 510, SCG configuration logic 520, handover control logic 530, and communication logic 540. In alternative implementations, the components or a portion thereof may be located externally with respect to wireless station 120.

MCG control logic 510 may include logic to generate and transmit/receive control signaling to/from UE 110, which may be an NR-DC device communicating via a 5G SCG (e.g., SgNB). For example, MCG control logic 510 may provide anchoring operations and control plane signaling for each 5G NR SCG in an SCG-set assigned to MCG (anchor cell).

SCG configuration logic 520 may include logic to configure a set of 5G NR cells anchored by a 5G MCG (e.g., an MgNB). For example, SCG configuration logic 520 may use RRC to configure multiple SCGs having coverage areas that at least partially overlap with a coverage area of the MCG.

RRC may correspond to a protocol that handles signaling between UE 110 and RAN 130. RRC-defined modes (e.g., idle, connected, inactive, etc.) and allowed transitions may be handled by the control plane which includes an RRC layer. During RRC idle mode, for example, UE 110 may camp on an MCG after MCG selection or reselection takes place, where factors such as, for example, radio link quality, cell status, and radio access technology may be considered. As used herein, "camping" on a selected MCG refers to UE 110 maintaining data exchanges with core network 140 within the confines of the selected MCG (e.g., associated with one of wireless stations 120). A cell or MCG may include a coverage area served by a gNB (e.g., one of wireless stations 120) using a particular frequency band. Thus, in some cases, an MCG and wireless station 120 servicing the MCG may be referred to interchangeably.

UE 110 may also monitor a paging channel to detect incoming calls and acquire system information. In the RRC idle mode, the control plane protocols include MCG selection and reselection procedures. During RRC connected mode, UE 110 may provide the MCG with downlink channel quality and neighbor cell information so the MCG may assist UE 110 to setup the most suitable SCGs for dual connectivity. For example, UE 110 may measure parameters (e.g., radio link signal strength) associated with a current set of SCGs to which UE 110 has dual connectivity, as well as the neighboring SCGs. The key parameters (such as radio link signal strength) of the SCG may be measured for the intra-frequency and inter-frequency neighboring SCGs. The measurements may be tracked and uploaded to the RRC layer, which makes control decisions on which SCGs UE 110 is configured to connect using dual connectivity. Accordingly, SCG fast selection may be based on a number of levels of criteria, which may include absolute priority, radio link quality, and/or SCG accessibility, or any combination of the criteria, for example, according to relative weighted values that are configurable for one or more of the criteria.

SCG configuration logic 520 may configure a secondary node to store UE context information in some instances and not to store the UE context in other instances, when UE 110 transitions to an RRC inactive mode.

Handover control logic 530, using control information from MCG control logic 510 and/or configuration information from SCG configuration logic 520, may include logic to facilitate a handover associated with communications from one cell to another cell. For example, handover control logic 530 may handover communications from one 5G MCG to another 5G MCG. Handover control logic 530 may also handover communications from a 5G MCG to a 5G NR SCG. Handover control logic 530 may also handover communications from a 5G NR SCG to another 5G NR SCG. For example, if UE 110 is located in an area supporting 5G communications, handover control logic 530 may transition or handoff communications associated with wireless station 120-1 to wireless station 120-2 in the 5G network. The term "handover" as used herein (also referred to herein as "handoff") should be broadly construed as the process of transferring an RRC session from one cell or channel to another cell or channel while the data session is occurring and substantially without the loss or interruption of service. In one implementation, in a standalone (SA) NR-NR DC architecture, handover control logic 530 may handover communications from a 5G MCG (e.g., sub-6) to a 5G NR SCG (e.g., mmWave cell).

Communication logic 540, using information from MCG control logic 510, SCG configuration logic 520, and/or handover control logic 530, may include logic to communicate with elements in environment 100 directly or indirectly. For example, communication logic 540 may communicate with UE 110 to establish an RRC connection. Communication logic 540 may also initiate communications with another cell, such as another 5G MCG and/or a 5G SCG to allow an NR-DC UE 110 to communicate via a 5G network, as further described below.

Figure 6:
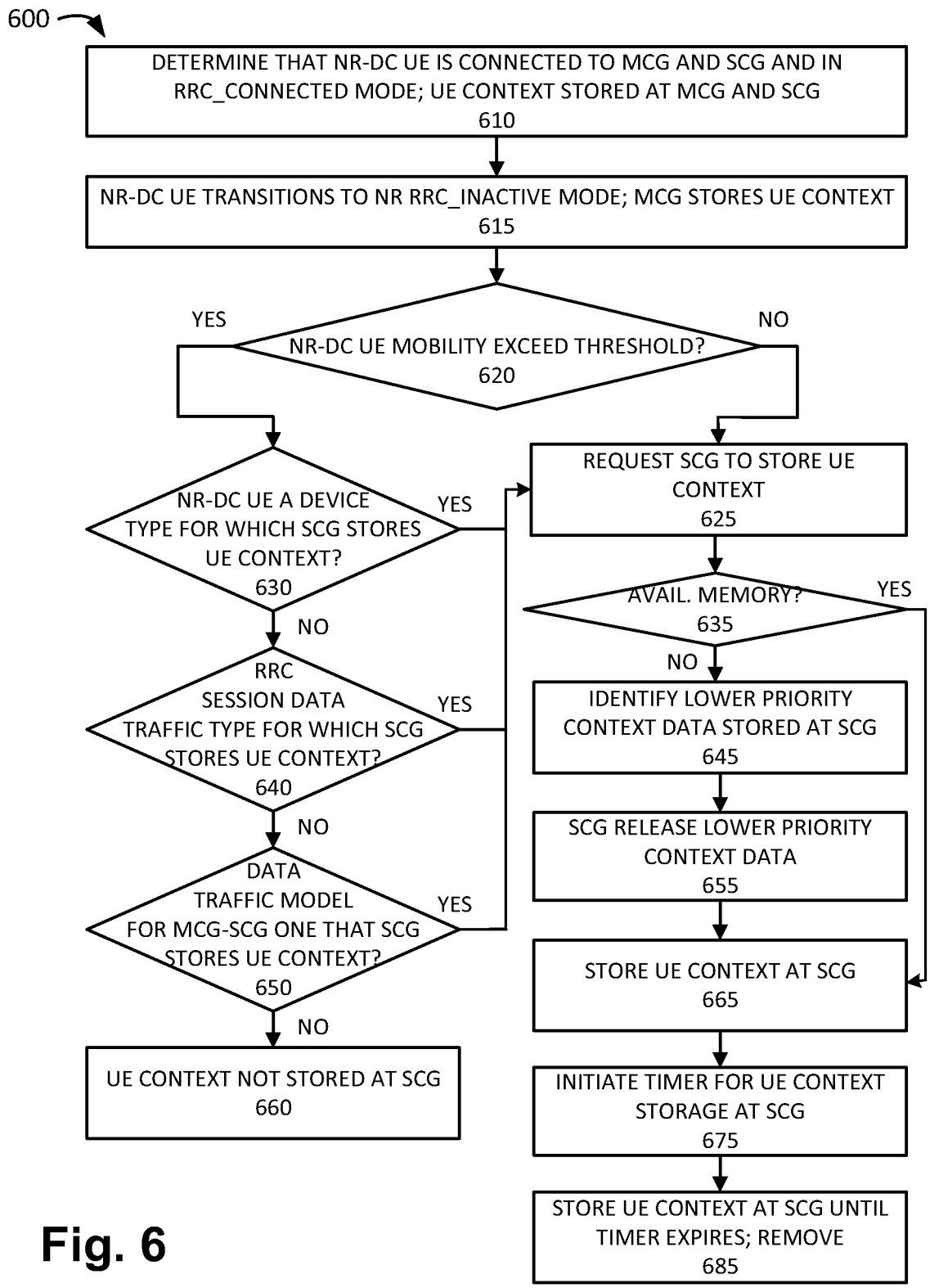
FIG. 6 is a flow diagram illustrating processing by various components in the environment of FIG. 1 in accordance with an exemplary implementation.

FIG. 6 is flow diagram illustrating exemplary processing 600 associated with NR-DC UE 110 anchored to a 5G NR wireless station (e.g., 120-1) via a 5G NR MCG (e.g., RAN 130-1) overlapping (or co-coverage) service areas with a secondary 5G wireless station (e.g., 120-2) via 5G NR SCG (e.g., RAN 130-2). Processing 600 may begin with wireless station 120-1 determining that NR-DC UE 110 is an NR RRC connected mode, and wireless station 120-1 and wireless station 120-2 storing UE context for UE 110 (block 610). For example, wireless station 120-1 may receive UE context information (e.g., access stratum) from network device 150 in core network 140.

Processing 600 may further include UE 110 transitioning to NR RRC inactive mode 130, and wireless station 120-1 storing UE context of UE 110 (block 615). For example, wireless station 120-1 may send an NR RRC suspend message to UE 110. Wireless station 120-1 may control whether the UE context is also stored at wireless station 120-2. In one implementation, wireless station 120-1 may progressively evaluate, in a prioritized order, a number of criteria to make the determination. Wireless station 120-1's evaluation may include wireless station 120-1 first determining whether a degree of mobility associated with UE 110 exceeds a particular threshold, when UE mobility is the criterion having top priority (block 620). The determination may be based on any data related to the mobility of UE 110, for example, a record of handover instances over a period of time, which may be obtained by wireless station 120-1 from network device 150-1 responsive to a request from wireless station 120-1 that identifies UE 110. If UE 110 does not exceed the applicable mobility threshold (block 620—NO), then wireless station 120-1 may message wireless station 120-2 requesting it to store the UE context for UE 110 (block 625). That is, wireless station may determine that UE 110 is relatively stationary and likely to continue to be used as a secondary node when UE 110 transitions back to NR RRC connected mode 220, making it beneficial for wireless station to retain the UE context.

On the other hand, where UE 110's mobile profile exceeds the applicable mobility threshold (block 620—YES)—indicating that UE 110 is likely to be out of the coverage area of wireless station 120-2 when UE 110 resumes an active connection—wireless station 120-1 may further evaluate whether a device type determined for UE 110 is of a type for which a secondary node (e.g., wireless station 120-2) is to store the UE context (block 630). For example, subscription information associated with UE 110 may be compared to a list device types that require a relatively quick data session set-up response, for example, when UE 110 returns to NR RRC connected mode 220. In one implementation, subscription information may include a radio access technology (RAT) frequency selection priority (RFSP) index value, a service profile identifier (SPID), or other type of identifier indicating a device type, for example, obtained from network device 150. If a determination is made that UE 110 corresponds to a device type for which the UE context is to be stored in the secondary node (block 630—YES), then wireless station 120-1 may message wireless station 120-2 requesting storage of the UE context (block 625).

On the other hand, where UE 110 corresponds to a device type for which the UE context is not stored in the secondary node (block 630—NO), then wireless station 120-1 may further evaluate whether a data traffic type associated with the NR RRC session is of a type for which a secondary node (e.g., wireless station 120-2) is to store the UE context (block 640). In one implementation, wireless station 12-1 may use data from the NR RRC service request to compare to a list device types that involve relatively less frequent communication (e.g., signaling). If the data traffic is determined to be of a type for which UE context is to be stored at the secondary node (block 640—YES), then wireless station 120-1 may message wireless station 120-2 requesting storage of the UE context (block 625).

On the other hand, where data traffic does not correspond to the type of data traffic for which the UE context is not stored in the secondary node (block 640—NO), then wireless station 120-1 may further evaluate whether a data traffic model associated with the wireless station 120-1 and wireless station 120-2 pairing is one for which a secondary node (e.g., wireless station 120-2) is to store the UE context (block 650). For example, data may indicate that certain master node-secondary pairings are designated for storage of the UE context, while others are not. In some instances, a master node, when paired with some secondary nodes, may call for storage of UE context in the secondary node, and when paired with other secondary nodes does not. If the immediate MCG-SCG pairing, for example, is designated for storage of the UE context (block 650—YES), then wireless station 120-1 may message wireless station 120-2 requesting storage of the UE context (block 625). On the other hand, when the immediate MCG-SCG pairing, for example, is not designated for storage of the UE context (block 650—NO), then the UE context is not stored in and/or deleted from wireless station 120-2 when UE 110 is in NR RRC inactive mode 230 (block 660), and process 600 ends. A different number of criteria and/or other criteria, having priorities different than those described, may be used to evaluate whether it is more beneficial than not to store UE context in wireless station 120-2 when UE 110 is in NR RRC inactive mode 230. For example, evaluation criteria and prioritization may be trained by artificial intelligence (AI) and/or machine learning network device 150, and/or updated by a self-organizing network (SON) network device 150.

Referring to block 625, when wireless station 120-2 has been requested to store the UE context, wireless station 120-2 may assess current storage space to determine whether memory is available to store the UE context (block 635). If wireless station 120-2 has sufficient memory (block 635—YES), then the UE context is stored at secondary wireless station 120-2 (block 665). On the other hand, if insufficient storage is available (block 635—NO), then process 600 may include wireless station 120-2 identifying context currently being stored at wireless station 120-2 that has an associated relative priority that is lower than the immediate UE context (block 645). Wireless station 120-2 may release the lower priority context data (block 655) to free up memory for storing the immediate UE context (block 665). Upon storing the UE context, wireless station 120-2 may initiate a timer for the storage of the UE context at wireless station 120-2 (block 675) which may be set to a time value based on, for example, instructions from network device 150. The UE context is then stored until the time expires and then the UE context is removed from wireless station 120-2 (block 685), and process 600 ends.

Implementations described herein provide for 5G service continuity for an NR-DC device by configuring a set of SCGs to be anchored to a non-5G MCG, where only one of the SCGs is active at a time for providing mmWave connectivity to a UE. When the current 5G connectivity degrades due to UE movement or physical obstructions, the UE's MAC CE may initiate an on-demand switch (layer 2) to another SCG in the set of SCGs anchored to the MCG. In this manner, handover is made between SCGs without the need to tear down and re-establish an SCG, and thus eliminating disruption to continuous mmWave service. Moreover, this results in a comparatively lower signaling overhead than conventional handovers involving signaling-intensive RRC operations.

The foregoing description of exemplary implementations provides illustration and description, but is not intended to be exhaustive or to limit the embodiments to the precise form disclosed. Modifications and variations are possible in light of the above teachings or may be acquired from practice of the embodiments.

For example, features have been described above with respect to secondary node-centric algorithm for determining whether storage of UE context at a master node and a secondary node results in a net-benefit for an RRC session. In other implementations, the algorithm may contemplate various scenarios in which a UE device transitions from the NR RRC inactive mode back to NR RRC connected mode, and for which it would not be beneficial and/or efficient to store the UE context in the secondary node. For example, once the UE returns to the connected mode, the master node may determine that dual connectivity is no longer need because of RRC coverage parameters. In this case, the UE context would have been stored in the secondary node during the RRC inactive mode only to have to then be removed after the state transition. In another scenario, the master node may determine that dual connectivity needs to be maintained, but that a different secondary node is to be used by the UE device for this purpose. In which case, the UE context would have been stored in the secondary node during the RRC inactive mode only to have to then be handed over to the different secondary node after the state transition. In yet another scenario, the UE device may make the state transition under a different master node that is paired with a different secondary node. In which case, the UE context would have been stored in the secondary node during the RRC inactive mode only to have to then be handed over to the different secondary node after the state transition. In still another scenario, the UE device may make the state transition in a different RAN paging area corresponding to a different master node and a different secondary node. In which case, the UE context would have been stored in the secondary node during the RRC inactive mode only to have to then be handed over to the different secondary node after the state transition. Other scenarios are possible.

Further, while series of acts have been described with respect to FIG. 6, the order of the acts and signal flows may be different in other implementations. Moreover, non-dependent acts may be implemented in parallel.

To the extent the aforementioned embodiments collect, store or employ personal information of individuals, it should be understood that such information shall be collected, stored and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that various features described above may be implemented in many different forms of software, firmware, and hardware in the implementations illustrated in the figures. The actual software code or specialized control hardware used to implement the various features is not limiting. Thus, the operation and behavior of the features were described without reference to the specific software code—it being understood that one of ordinary skill in the art would be able to design software and control hardware to implement the various features based on the description herein.

Further, certain portions of the invention may be implemented as "logic" that performs one or more functions. This logic may include hardware, such as one or more processors, microprocessor, application specific integrated circuits, field programmable gate arrays or other processing logic, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A method, comprising:
    sending, by a first wireless station, a suspend message to a second wireless station serving a radio resource control (RRC) session for a user equipment (UE) device;
    storing, by the first wireless station, UE device context information from a core network for the RRC session; and
    evaluating, by the first wireless station, a set of criteria for storing the UE device context information at the second wireless station, wherein the evaluating comprises:
        determining two or more of:
            a level of mobility for the UE device;
            a device type for the UE device;
            a data traffic type associated with the RRC session; or
            a data traffic model for a pairing of the first wireless station and the second wireless station, and
        determining a likelihood that the second wireless station will maintain an RRC connection to the UE device following a state transition for the UE device.

2. The method of claim 1, further comprising:
    sending, based on the likelihood that the RRC connection is to be maintained, a first message to the second wireless station to store the UE device context information; and
    sending, based on the likelihood that the RRC connection is not to be maintained, a second message to the second wireless station to not store the UE device context information.

3. The method of claim 2, wherein sending the first message comprises sending a timer value indicating an amount of time after which the second wireless station is to no longer store the UE device context information.

4. The method of claim 1, wherein, based on the likelihood that the RRC connection is not to be maintained, the method further comprising:
    establishing another RRC connection to another wireless station;
    triggering a handover of the UE device context information from the second wireless station to the other wireless station; and
    removing the RRC connection.

5. The method of claim 1, wherein, based on the likelihood that the RRC connection is to be maintained, the method further comprising:
    determining that the second wireless station is in an overload condition;
    determining that a first relative priority associated with RRC session is greater than a second relative priority associated with another RRC session; and
    terminating the other RRC session.

6. The method of claim 1, wherein the determining further comprises at least one of:
    determining the level of mobility based on a record of handover times associated with the UE device;
    determining the device type based on subscription information from the core network;
    determining the data traffic type based on a service request associated with the RRC session; or
    determining the data traffic model based on a record of observed data traffic.

7. The method of claim 1, wherein the determining further successively comprises determining, according to a relative priority, the level of mobility, the device type, the data traffic type, or the data traffic model until a determination is made of the likelihood that the RRC connection is to be maintained or until each of the criteria has been evaluated.

8. A device, comprising:
    a processor configured to:
        send a suspend message to a wireless station associated with a radio resource control (RRC) session for a user equipment (UE) device;
        store UE device context information from a core network for the RRC session; and
        evaluate a set of criteria for further storing the UE device context information at the wireless station, wherein the evaluation comprises:
            determining two or more of:
                a level of mobility for the UE device;
                a device type for the UE device;
                a data traffic type associated with the RRC session; or
                a data traffic model for a pairing of the wireless station and another wireless station, and
            determining a likelihood that the wireless station will maintain an RRC connection to the UE device following a state transition for the UE device.

9. The device of claim 8, wherein the processor is further configured to:
send, based on the likelihood that the RRC connection is to be maintained, a first message to the wireless station to store the UE device context information; and
send, based on the likelihood that the RRC connection is not to be maintained, a second message to the wireless station to not store the UE device context information.

10. The device of claim 9, wherein to send the first message, the processor is configured to send a timer value indicating an amount of time after which the wireless station is to no longer store the UE device context information.

11. The device of claim 8, wherein, based on the likelihood that the RRC connection is not to be maintained, the processor is further configured to:
establish another RRC connection to a third wireless station;
trigger a handover of the UE device context information from the wireless station to the third wireless station; and
remove the RRC connection.

12. The device of claim 8, wherein, based on the likelihood that the RRC connection is to be maintained, the processor is further configured to:
determine that the wireless station is in an overload condition;
determine that a first relative priority associated with RRC session is greater than a second relative priority associated with another RRC session; and
terminate the other RRC session.

13. The device of claim 8, wherein the processor is configured to at least one of:
determine the level of mobility based on a record of handover times associated with the UE device;
determine the device type based on subscription information from the core network;
determine the data traffic type based on a service request associated with the RRC session; or
determine the data traffic model based on a record of observed data traffic.

14. The device of claim 8, wherein the processor is configured to successively determine, according to a relative priority, the level of mobility, the device type, the data traffic type, or the data traffic model until the processor determines the likelihood that the RRC connection is to be maintained or until each of the criteria has been evaluated.

15. A non-transitory computer-readable medium for storing instructions which, when executed by a processor associated with a first wireless station, cause the processor to:
send a suspend message to a second wireless station associated with a radio resource control (RRC) session for a user equipment (UE) device;
store UE device context information from a core network for the RRC session; and
evaluate a set of criteria for storing the UE device context information at the second wireless station, wherein the evaluation comprises:
determining two or more of:
a level of mobility for the UE device;
a device type for the UE device;
a data traffic type associated with the RRC session; or
a data traffic model for a pairing of the first wireless station and the second wireless station, and
determine a likelihood that the second wireless station will maintain an RRC connection to the UE device following a state transition for the UE device.

16. The non-transitory computer-readable medium of claim 15, wherein the instructions further cause the processor to:
send, based on the likelihood that the RRC connection is to be maintained, a first message to the second wireless station to store the UE device context information; and
send, based on the likelihood that the RRC connection is not to be maintained, a second message to the second wireless station to not store the UE device context information.

17. The non-transitory computer-readable medium of claim 16, wherein to send the first message, the instructions further cause the processor to:
send a timer value indicating an amount of time after which the second wireless station is to no longer store the UE device context information.

18. The non-transitory computer-readable medium of claim 15, wherein the instructions further cause the processor to:
establish another RRC connection to another wireless station;
trigger a handover of the UE device context information from the wireless station to the other wireless station; and
remove the RRC connection.

19. The non-transitory computer-readable medium of claim 16, wherein the instructions further cause the processor to:
determine that the second wireless station is in an overload condition;
determine that a first relative priority associated with RRC session is greater than a second relative priority associated with another RRC session; and
terminate the other RRC session.

20. The non-transitory computer-readable medium of claim 15, wherein the instructions further cause the processor to:
determine the level of mobility based on a record of handover times associated with the UE device;
determine the device type based on subscription information from the core network;
determine the data traffic type based on a service request associated with the RRC session; or
determine the data traffic model based on a record of observed data traffic.

* * * * *